United States Patent [19]

Freudenreich et al.

[11] Patent Number: 4,731,709

[45] Date of Patent: Mar. 15, 1988

[54] HEADLIGHT FOR AUTOMOBILES

[75] Inventors: Erwin Freudenreich, Lippstadt; Werner Stuckstedte, Rheda-Wiedenbrück, both of Fed. Rep. of Germany

[73] Assignee: Hella KG Hueck & Co., Lippstadt, Fed. Rep. of Germany

[21] Appl. No.: 25,820

[22] Filed: Mar. 13, 1987

[30] Foreign Application Priority Data

Apr. 17, 1986 [DE] Fed. Rep. of Germany ....... 3612987

[51] Int. Cl.[4] .............................................. B60Q 1/04

[52] U.S. Cl. ...................................... 362/80; 362/294; 362/373

[58] Field of Search .................. 362/294, 373, 96, 80, 362/61

[56] References Cited

U.S. PATENT DOCUMENTS

| | | | |
|---|---|---|---|
| 3,864,547 | 2/1975 | Ray | 362/294 |
| 4,345,306 | 8/1982 | Summey | 362/373 X |
| 4,405,974 | 9/1983 | Quiogue | 362/373 X |
| 4,564,891 | 1/1986 | Daumuller | 362/294 |
| 4,635,173 | 1/1987 | Dressler et al. | 362/373 X |

FOREIGN PATENT DOCUMENTS

| | | | |
|---|---|---|---|
| 2303473 | 8/1974 | Fed. Rep. of Germany | 362/373 |
| 2346643 | 3/1975 | Fed. Rep. of Germany | 362/373 |

*Primary Examiner*—Charles J. Myhre
*Assistant Examiner*—Sue Hagarman
*Attorney, Agent, or Firm*—Max Fogiel

[57] ABSTRACT

The invention is concerned with a headlight for automobiles the interior cavity of which is ventilated with a tube filled with a desiccative. The tube is guided into an opening at the rear of the reflector and is fixed into place by means of a screw lock. A socket-like cover, exhibiting a ventilation hole, is locked into place and pushed onto the end section of the tube which protrudes out of the opening on the rear of the reflector. The socket like cover serves to protect the tube filled with the desiccative against contamination and flooding.

19 Claims, 6 Drawing Figures

HEADLIGHT FOR AUTOMOBILES

Figure 1:
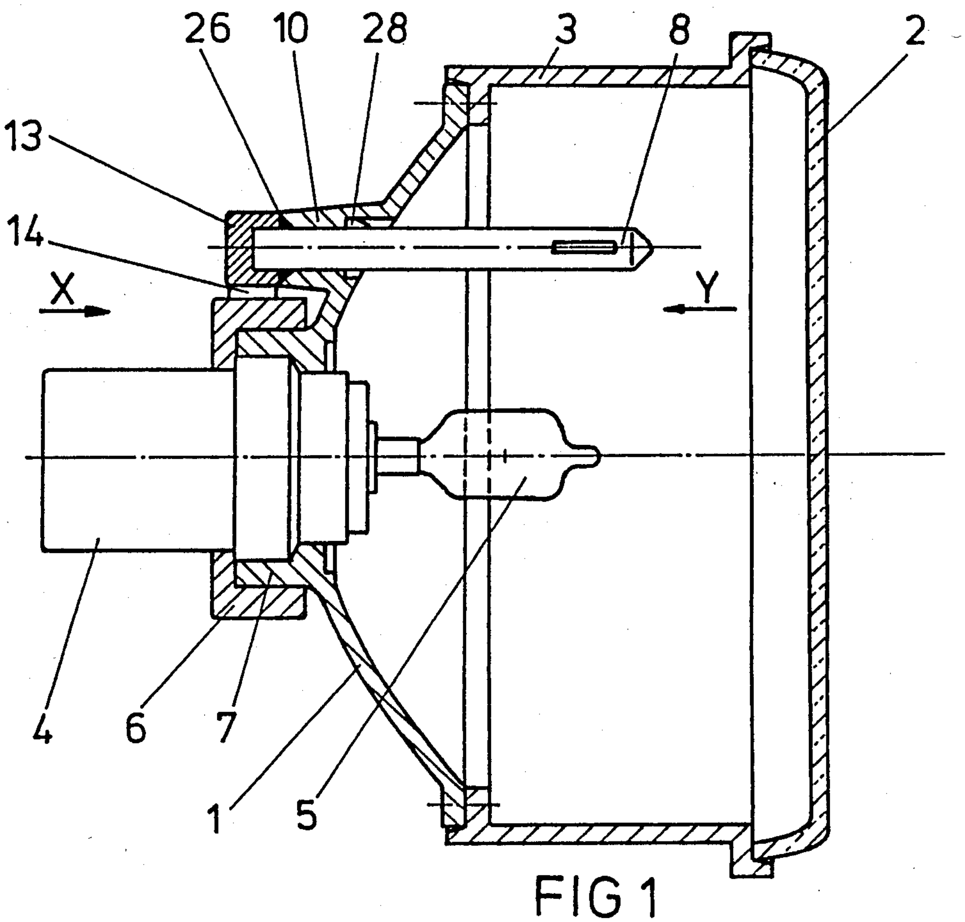

The invention is concerned with a headlight for automobiles which is fitted with a reflector dish made of plastic, a glass disc covering the interior of the reflector, a light bulb which is inserted into an opening in the rear of the reflector, a rod-shaped tube filled with a desiccative connecting the interior of the reflector with the external air and which, with its end segment, is guided into and locked onto (a) an opening of the reflector being surrounded by a collar or (b) a tubus which is inserted between the reflector and the glass disc, while the other, free end segment of the tube protrudes into the interior of the headlight and is situated in the vicinity of the light source, and a cover which is built onto the rear of the headlight exhibiting a ventilation hole and which is to protect the tube filled with the desiccative against contamination and flooding.

A headlight for automobiles such as this is well known from the specification DE-OS No. 22 22 449. The paraboloid reflector is tightly connected to the glass disc with its perimeter. The light bulb is inserted from the rear into an opening in the apex of the reflector with the globe pointing forward. A covering cap is attached to the neck of the reflector surrounding the opening. The interior of the reflector is connected with the ambient air via a rod-like tube inserted into an opening of the reflector and which is surrounded by a collar and attached to it e.g. through glueing. On the rear of the reflector the tube is protected against contamination and flooding by means of a cover fitted with a ventilation hole which is attached to the collar surrounding the opening in a not further specified fashion. The rod-like tube protruding into the interior of the reflector is filled with a desiccative which binds moisture at low temperatures through adsorption and which desorbs the adsorbed mositure at high temperatures.

After the light bulb of the headlight is switched off, the air in the interior of the headlight cools off and contracts. Thus ambient air is sucked into the interior of the headlight through the tube filled with the desiccative until pressure equalization occurs. The moisture contained in the incoming air is bound by the desiccative through adsorption. For this reason the moisture cannot reach the interior of the headlight where it would condense on the glass disc and on the reflecting surface of the reflector. Thereby, the reflecting surface of a reflector made of sheet metal is protected against corrosion.

After the light bulb of the headlight is switched on, the temperature of the air in the interior of the headlight is raised whereby it expands and escapes through the tube filled with the desiccative. Desorption of the moisture already adsorbed in the desiccative occurs through the escaping air thereby regenerating the desiccative. The rod-shaped tube is arranged above the light bulb at a distance close enough so that the desiccative is heated to at least desorption temperature when the light bulb is switched on.

In a headlight such as this, the rod-shaped tube is inserted from the interior of the reflector into an opening in the reflector onto which it is attached e.g. through glueing. Through such a procedure, the reflecting surface of the reflector may be damaged. In a further stage, the cover which is fitted with a ventilation hole is mounted onto the collar surrounding the opening from the rear of the reflector and is affixed e.g. through glueing. A mounting procedure in which the parts are inserted from the interior and from the rear of the reflector is complicated and very time consuming. Furthermore a damaged tube cannot be exchanged with a new tube.

It is the task of the invention to improve a headlight for automobiles of the general kind described above, such that the mounting of the tube filled with the desiccative and of the cover fitted with a ventilation hole can proceed quickly and easily from the rear of the headlight and that furthermore a damaged tube may be exchanged quickly and easily with a new tube. In addition it should be possible that the opening receiving the tube which is cut into the reflector can be designed to have a diameter not significantly larger than the exterior diameter of the tube so that the reflecting surface of the reflector may be mounted close to the mantle of the tube. This task is achieved according to the invention through the following criteria:

(a) the rod-shaped tube filled with desiccative is designed to be long enough so that the end segment of the tube which is inserted into the opening protrudes out of the opening at the rear of the reflector or out of the tubus, (b) the cover which has a ventilation hole fitted into its wall is designed like a socket and is pushed over and locked onto the end segment of the tube which protrudes out of the opening.

(c) the socket-like cover touches the facing rim of the opening of the reflector or the tubus with its perimeter either directly or via an inserted O-ring seal, (d) the tube is reversibly arrested in the opening of the reflector or the tubus by means of a screw lock.

In such a solution the cover exhibiting the ventilation hole and the tube filled with desiccative are joined together in the premounting stage. The socket-like cover is thus used to handle the tube during its insertion and screw-locking. In order to achieve a good seal between the socket-like cover and the reflector an O-ring seal can be used which is press-fitted onto and pushed over the rod-like tube.

In a particularly advantageous further development of the invention a tenon is moulded onto the mantle of the tube which fits into a groove in the opening of the reflector or the tubus. This groove serves as a guide for the tenon during the insertion of the tube from the rear of the headlight into the opening of the reflector. In the final position of the tube the tenon locks into a step, which is cut into the interior surface of the cylindrical opening, or into a circumscribing mortise in the interior of the headlight. A bayonet-like screw-lock such as this can be manufactured very cost-effectively and is very easily mounted. In this connection it is expedient if, in the final position of the tube, the tenon fits into an indentation of the step in the opening. The fit of the tenon and the indentation is made self-locking by the spring-like action of the O-ring seal which is pushed onto the rod-shaped tube. In this connection it is further expedient if the groove in the opening of the reflector or the tubus serving as a guide for the tenon of the tube widens at that end section pointing towards the interior of the headlight by means of at least one side face segment running at an acute angle with respect to the longitudinal direction of the tube. In a solution such as this the screw-locking of the rod-shaped tube after its insertion into the opening of the headlight is facilitated since the side face segment running at an acute angle with respect to the longitudinal direction of the tube serves as a glide face for the tenon being moulded onto the mantle of the tube.

It is further advantageous if the opening at the rear of the headlight exhibits a conically tapered entrance which is to receive the O-ring seal. By means of this entrance cone the O-ring seal is not only pressed against the reflector or the tubus respectively but also against the mantle of the rod-shaped tube. A very good seal between the socket-like cover and the reflector or the tubus is thereby guaranteed. Furthermore the conical entrance serves as an aid during the insertion of the rod-shaped tube into the opening of the headlight.

It is considered to be a further advantage, if the socket-like cover is press-fitted onto the free end segment of the tube. It is thus further advantageous if a circumscribing ring is moulded onto that end segment of the mantle of the tube pointing towards the rear of the headlight which locks into a corresponding groove being cut into the cylindrical inner surface of the socket-shaped cover and if the end face of the tube touches the bottom of the socket-like cover. In a solution such as this the socket-like cover is fitted onto the free end segment of the tube in a self-locking fashion. The cover is arrested onto the rod-shaped tube in both radial and axial direction by means of the press-fit between the socket-like cover and the rod-shaped tube, e.g. between the ring moulded onto the mantle of the tube and the bottom of the groove in the cover and through the end face of the tube touching the bottom of the cover.

It is furthermore advantageous if a tenon pointing radially outward is moulded onto the mantle of that free end segment of the tube receiving the socket-like cover which locks into an indentation being cut into the inner surface of the perimeter of the socket-like cover. Through this measure the socket-like cover is not only secured against twisting inside the reflector but it is also fixated in a certain position with respect to the reflector. The latter is particularly important if the ventilation hole is to take on a predetermined position.

It is also advantageous if the socket-like cover exhibits a channel on the circumscribing edge of the inner bottom surface. It is thereby secured, that the endface of the tube comes to touch the circumscribing edge of the inner bottom surface of the socket-like cover during the attachment of the socket-like cover onto the rod-shaped tube.

In an advantageous further development of the invention the socket-like cover exhibits a cylindrical hollow extension having an open end face and pointing radially outward and the cavity of which is brought into connection with the interior of the headlight via the ventilation hole of the socket-like cover and the tube being filled with the desiccative. A cylindrical extension moulded onto the socket-like cover such as this forms an additional protection for the tube filled with desiccative against contamination and flooding. The optimal position for the cylindrical extension is achieved if the extension points downward in the given set-up of the headlight.

In order for the desiccative to reach desorption temperature in the fastest possible way it is advantageous to position the rod-shaped tube at the closest possible distance above the light-bulb. This causes the cover on the rear of the headlight to be situated very closely to the neck of the reflector or the fitting of the lamp. For this reason the invention has to meet a further requirement, namely that in the given set-up of the headlight the longitudinal direction of the hollow cylindrical extension has to form the smallest possible angle with the vertical direction and is still pointing downward.

This aim is, according to a further advantageous embodiment of the invention, achieved in that the longitudinal axis of the hollow cylindrical extension is offset by a certain amount from the longitudinal axis of the tube and in that in the given set-up of the headlight this axis is positioned above the axis of the tube. The angle between the longitudinal axis of the cylindrical extension and the vertical direction is thus smallest if the cylindrical extension touches the reflector neck or the lamp fitting with its mantle.

It is a further advantage if the hollow cylindrical extension is moulded onto the mantle surface of the socket-like cover and if the cavity of the hollow cylindrical extension is connected to the ventilation hole via a depression being cut into the bottom of the interior of the socket-like cover. In this way the height of the socket-like cover is not increased. It is also advantageous if the rod-shaped tube exhibits a conical tip on the end segment pointing into the interior of the headlight and if ventilation slits are being cut into the wall of this end segment. Through the aid of the conical tip on the free end of the tube the insertion of the tube into the opening of the headlight is greatly facilitated.

It is furthermore advantageous if an elastic hose is press-fitted onto the free end of the hollow cylindrical extension of the socket-like cover. An elastic tube such as this can be lead to particular places in the vehicle e.g. the passenger cabin where the air has a lower moisture content than in the engine space.

Furthermore it is advantageous if the hose is angled and if its free end points towards the rear of the reflector. An angled hose such as this gives additional protection for the interior of the headlight or the tube filled with desiccative respectively against contamination and flooding.

Figure 2:
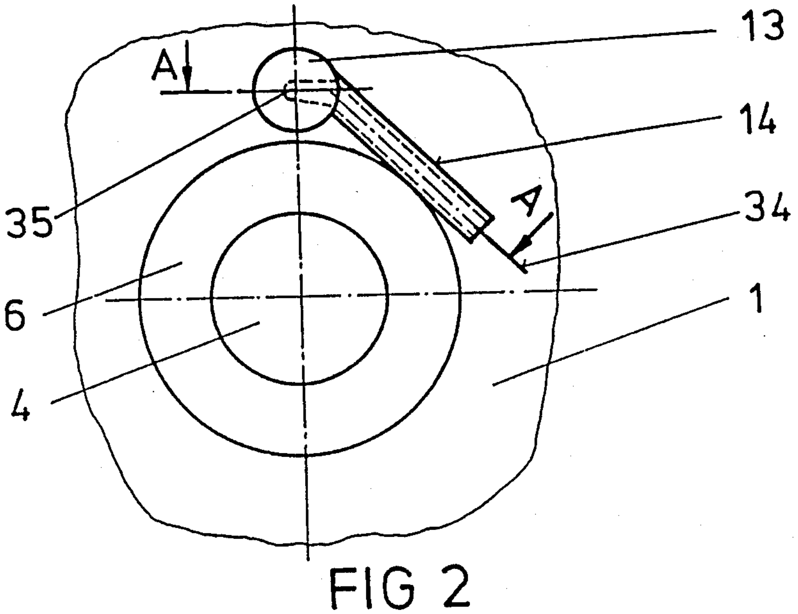
Figure 3:
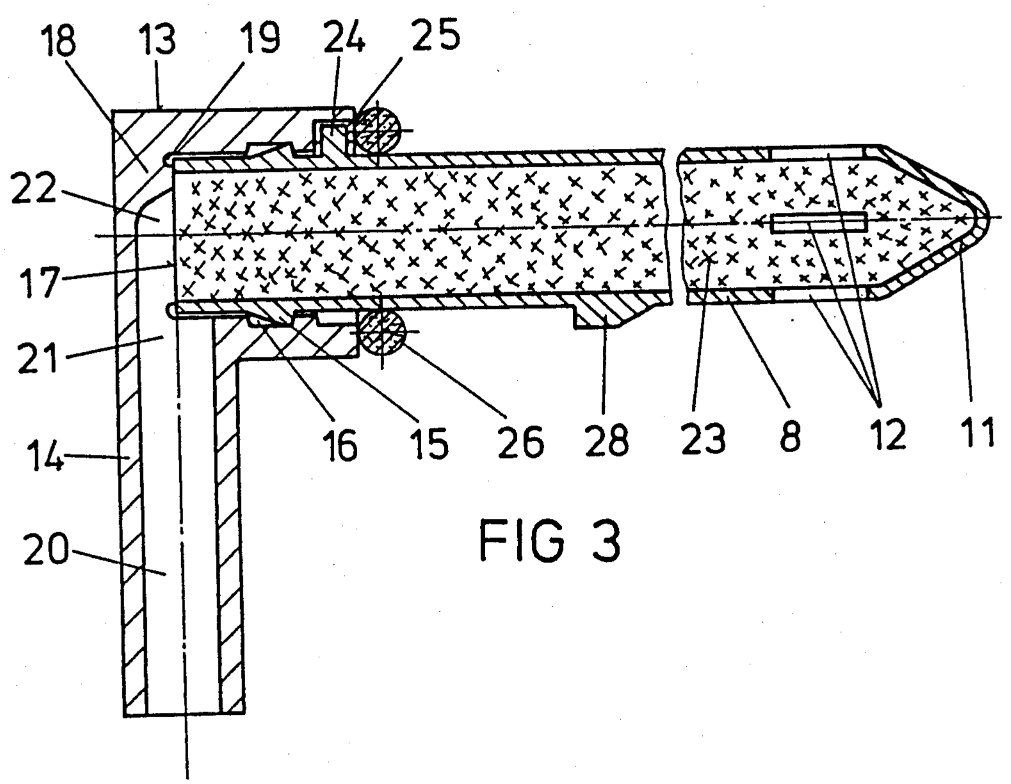
Figure 4:
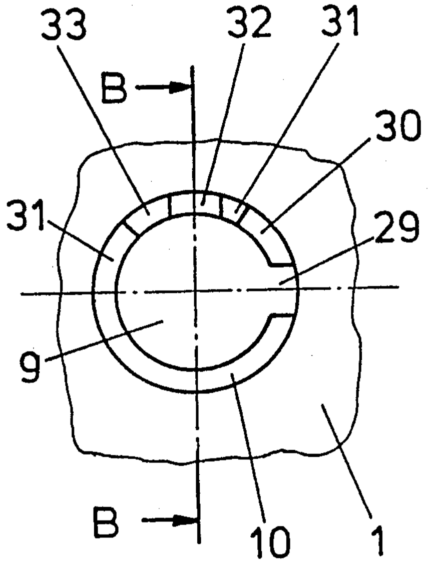
Figure 5:
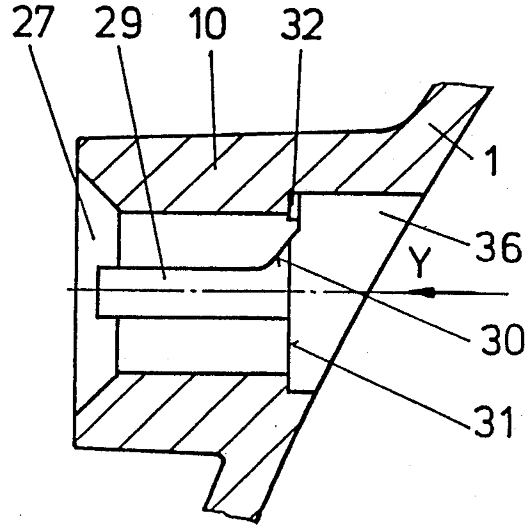
Figure 6:
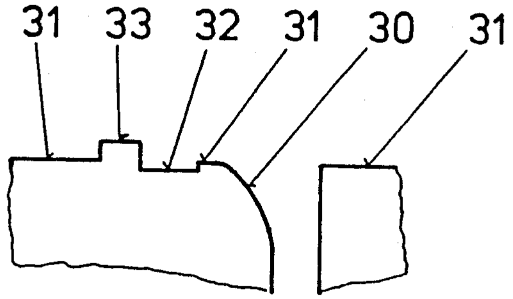

The invention is represented in the drawing and it shows:

FIG. 1; a vertical longitudinal section through a headlight together with a tube inserted into the opening of the reflector and filled with a desiccative and which, with its end segment pointing towards the rear of the headlight, is tightly attached to a cover cap exhibiting a ventilation hole, FIG. 2; a view from direction Y onto the rear of the reflector, FIG. 3; a section through the rod-shaped tube and the tightly attached cover along line A—A, FIG. 4; a view from direction Y onto the opening in the reflector receiving the tube, FIG. 5; a section along line B—B through the opening of the reflector, and FIG. 6; a partial wind-up of the cylindrical interior surface of the opening of the reflector receiving the tube.

The interior cavity of the headlight is formed by a disc-shaped reflector (1), a glass disc (2) covering the interior of the reflector (1) and a tubus (3) being tightly inserted between the reflector and the glass disc. The tubus (3) is necessary if the glass disc is to be fitted to the contour of a strongly inclined or arrowed front of the automobile or if the headlight is to function according to the projector principle, since in that case there must be sufficient space in between the light bulb (4) and the glass disc in order to accomodate the support for the aperture and the converging lens.

The light bulb (4) is inserted from the rear of the reflector into an opening in the apex of the reflector (1) with the globe (5) pointing forward and is arrested by means of a cap (6) which is pushed onto the collar (7) surrounding the opening. The rod-shaped tube (8) filled with desiccative (23) is arranged just above the globe (5) of the light bulb (4) in the shortest possible distance and is inserted into the opening (9) of the reflector (1) above the cap (6) in a bayonet-like fashion. The interior cavity of the headlight is connected to the ambient air via the rod-shaped tube (8) which is filled with the desiccative (23).

The opening (9) receiving the rod-shaped tube (8) is surrounded by a collar (10) on the rear of the reflector and exhibits a cylindrical bore (36) on the interior of the reflector. The end segment of the rod-shaped tube (8) pointing towards the interior of the reflector exhibits a conical tip (11). Ventilation slits (12) are introduced into the wall of the tube (8) adjacent to the tip (11). A self-locking socket-like cover (13) is attached to the end segment of the tube (8) protruding out of the opening (9) on the rear of the reflector (1) and a hollow cylindrical extension (14) having an open end face and pointing radially outward is moulded onto the mantle of the tube (8). After the attachment of the cover (13), the circumscribing ring (15) with triangular cross-section which is moulded on to the end segment of the tube (8) locks into a corresponding groove (16) which is cut into the cylindrical interior surface of the cover (13) and presses against the bottom of the groove (16). The ring (15) touches the adjacent side face of the groove (16) in the cover (13) with its surface pointing towards the interior of the reflector while the end face (17) of the tube touches the bottom surface (18) of the socket-like cover (13). A channel (19) is cut into the outer edge surrounding the inner surface of the bottom (18). The cavity (20) of the cylindrical extension (14) being moulded onto the cover (13) together with the opening (21) in the wall of the cover (13) and the depression (22) being cut into the bottom (18) of the cover (13) form a ventilation channel which connects the cavity of the tube (8) filled with desiccative (23) to the ambient air via the open bottom surface of the tube (8). The cover (13) is secured against twisting by means of a tenon (24) being moulded onto the mantle of the tube (8) which locks into an indentation (25) in the inner side surface of the cover (13).

In the pre-mounting stage not only the cover (13) is pushed onto the free end segment of the tube (8) in a self-locking fashion but also an O-ring seal of circular cross-section is pushed onto the tube (8) right up to the edge of the cover (13) as depicted in FIG. 3. Both the conical tip (11) of the tube (8) as well as the conical depression (27) of the opening (9) of the reflector (1) serve as an aid to the insertion of the tube (8) from the rear into the opening of the reflector (1). A groove (29) of the opening (9) running longitudinally along the direction of insertion serves as a guide for the tenon (28) being moulded onto the mantle of the tube (8). After the insertion of the tube (8) into the opening (9) the O-ring seal (26) fits into the depression (27) of the opening (9). During the turning of the tube (8) in the opening (9), the tenon (28) initially scapes along the side-face segment (30) of the groove leading towards the interior of the reflector. This side-face segment runs at an acute angle to the longitudinal direction of the tube (8) and widens the groove (29) towards the interior of the headlight. Subsequently the tenon (28) of the tube (8) locks into the step (31) in the cylindrical inner surface of the opening (9) being formed by the cylindrical bore (36) and engages in its final position into an indentation (32) of the step (31) in the opening (9) which serves as a click-stop. The O-ring seal (26) being compressed in between the reflector (1) and the cover (13) hereby provides a spring-like action. An overturning of the tube (8) beyond the click-stop is prohibited through the stop (33) being moulded onto the step (31) in the opening (9) adjacent to the click-stop (32). In order to achieve the maximum downward angle for the cylindrical extension (14) of the cover (13) carrying the ventilation channel the longitudinal axis (34) of the cylindrical extension (14) is designed to have the maximum possible off-set above the longitudinal axis (35) of the rod-shaped tube (8). It is through this feature that the mantle of the cylindrical extension (14) touches the mantle of the cap (6).

It is advantageous in connection with a headlight with a reflector having a relatively small reflecting surface, e.g. as is the case with an ellipsoid reflector, if the rod-shaped tube (8) filled with desiccative is supported in an opening near the perimeter of the reflector (1) or in an opening of the tubus (3) being inserted in between the glass disc (2) and the reflector (1).

What is claimed is:

1. A headlight for motor vehicles, comprising:
(a) a plastic reflector dish having an interior and a rear;
(b) a glass disc covering the interior of said reflector;
(c) a light bulb inserted into a first opening in the rear of said reflector;
(d) a rod-shaped tube filled with desiccative connecting the interior of said reflector with the external air environment;
(e) a collar surrounding said rod-shaped tube, said rod-shaped tube having an end segment guided into and locked onto a second opening in said reflector, said rod-shaped tube having a free end segment protruding into the interior of said headlight and being located in vicinity of said light bulb;
(f) a cover on the rear of said headlight and having a ventilation opening for protecting said tube filled with desiccative against contamination and flooding;
(g) said rod-shaped tube having a length so that said end segment of said tube inserted into said second opening protrudes out of said second opening at the rear of said reflector;
(h) said cover with said ventilation opening having a socket-shape and being pushed over and locked onto said end segment of said tube protruding out of said second opening;
(i) said socket-shaped cover contacting a facing rim of said second opening in said reflector;
(j) screw lock means for reversibly arresting said rod-shaped tube in said second opening in said reflector.

2. A headlight as defined in claim 1, wherein said tube has a mantle; a tenon molded onto said mantle; said second opening having a groove for passing said tenon; said groove guiding said tenon during insertion of said tube from the rear of said headlight into said second opening of said reflector; said second opening having an interior surface with a step cut thereinto for locking said tube in place in final installed position of said tube.

3. A headlight as defined in claim 2, wherein said step in said second opening has an indentation, said tenon locking into said indentation in said final installed position of said tube.

4. A headlight as defined in claim 3, wherein said tube has a longitudinal axis; said opening having at least one side face segment at an acute angle with respect to said longitudinal axis of said tube; said groove in said second opening of said reflector widening at the end section pointing towards the interior of said headlight by said side face segment.

5. A headlight as defined in claim 1, including an O-ring seal; said second opening in the rear of said headlight having a depression for receiving said O-ring seal.

6. A headlight as defined in claim 5, wherein said depression has a conical shape.

7. A headlight as defined in claim 1, wherein said socket-shaped cover is pressed-fitted onto the free end segment of said tube.

8. A headlight as defined in claim 7, including ring-shaped portion molded around the end segment of said tube pointing towards the rear of said headlight, said socket-shaped cover having a cylindrical inner surface with a groove corresponding to said ring portion, said ring portion locking into said corresponding groove in said cover, said tube having an end face in contact with said socket-shaped cover.

9. A headlight as defined in claim 1, including a tenon molded on the free end segment of said tube and pointing radially outward for receiving said socket-shaped cover, said cover having an inner surface with a depression cut thereinto, said tenon locking into said depression.

10. A headlight as defined in claim 1, wherein said cover has an inner bottom surface with a circumscribing edge, said cover having a channel on said circumscribing edge.

11. A headlight as defined in claim 1, wherein said cover has a cylindrical hollow extension with an open end-face and pointing radially outward, said cover having a cavity communicating with the interior of said headlight through said ventilation opening of said cover, said tube being filled with desiccative.

12. A headlight as defined in claim 11, wherein said tube has a longitudinal axis, said hollow cylindrical extension having a longitudinal axis offset by a predetermined amount from said longitudinal axis of said tube, said longitudinal axis of said hollow cylindrical extension being positioned above said axis of said tube.

13. A headlight as defined in claim 11, wherein said hollow cylindrical extension is molded on the surface of said cover.

14. A headlight as defined in claim 13, wherein said hollow cylindrical extension has said cavity, said cavity being connected to said ventilation opening through a depression cut into the interior bottom of said cover.

15. A headlight as defined in claim 1, wherein said tube has a conical tip on the end segment pointing into the interior of said headlight, said end segment having ventilation slits.

16. A headlight as defined in claim 1, wherein said cover has a hollow cylindrical extension with a free end; and an elastic hose pressed-fitted onto said free end of said hollow cylindrical extension.

17. A headlight as defined in claim 16, wherein said hose has a free end pointing towards the rear of said reflector, said hose being angled.

18. A headlight as defined in claim 1, including a tubus member inserted between said reflector and said glass disc.

19. A headlight for motor vehicles, comprising:

(a) a plastic reflector dish having an interior and a rear;
(b) a glass disc covering the interior of said reflector;
(c) a light bulb inserted into a first opening in the rear of said reflector;
(d) a rod-shaped tube filled with desiccative connecting the interior of said reflector with the external air environment;
(e) a tubus inserted between said reflector and said glass disc, said rod-shaped tube having an end segment guided into and locked onto said tubus, said rod-shaped tube having a free end segment protruding into the interior of said headlight and being located in vicinity of said light bulb;
(f) a cover on the rear of said headlight and having a ventilation opening for protecting said tube filled with desiccative against contamination and flooding;
(g) said rod-shaped tube having a length so that said end segment of said tube inserted into said second opening protrudes out of said second opening at the rear of said tubus;
(h) said cover with said ventilation opening having a socket-shape and being pushed over and locked onto said end segment of said tube protruding out of said second opening;
(i) said socket-shaped cover contacting a facing rim of said tubus;
(j) screw lock means for reversibly arresting said rod-shaped tube in said second opening in said reflector.

* * * * *